UNITED STATES PATENT OFFICE.

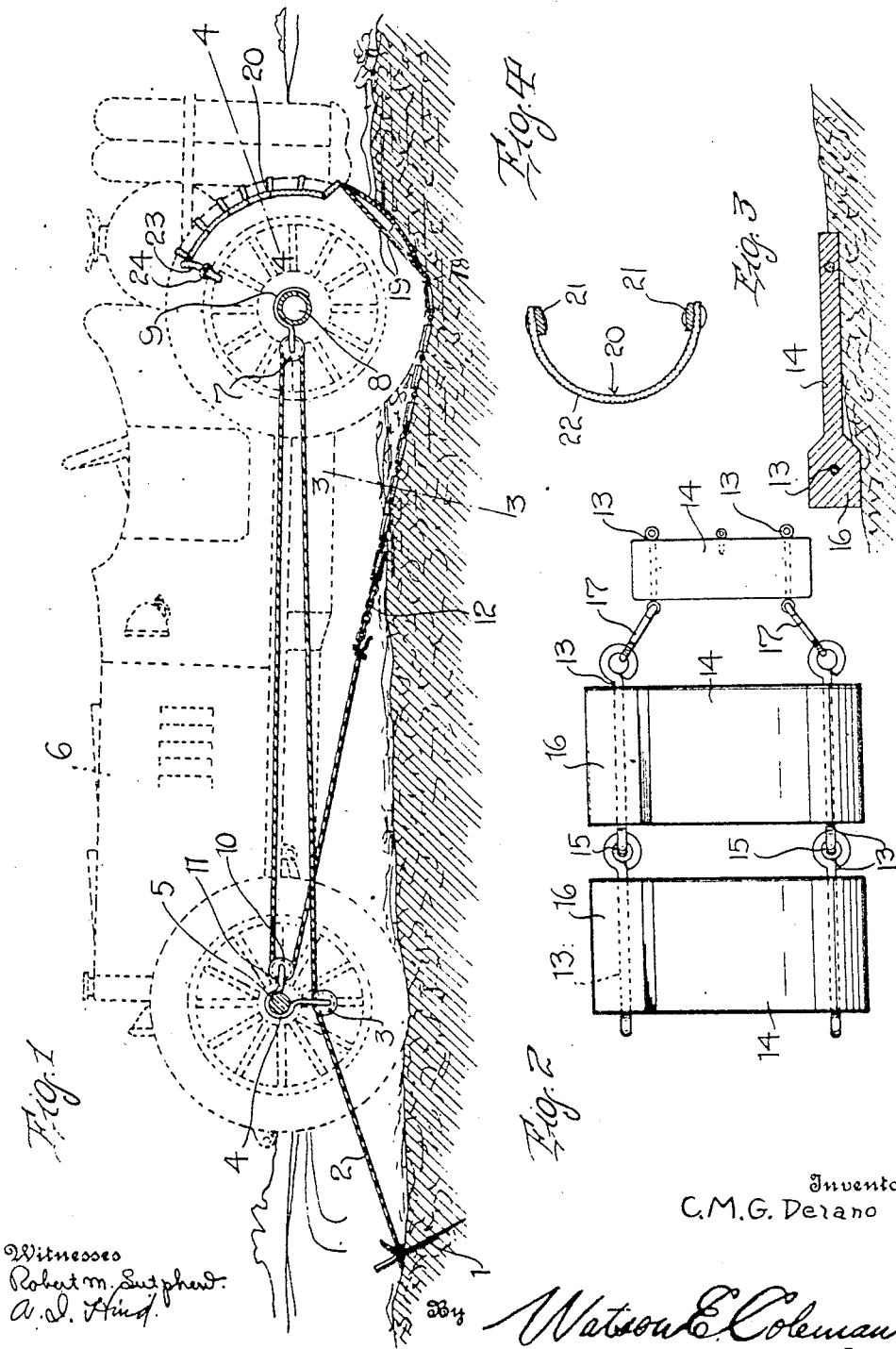

CHARLES MORILLO GREENLEAF DELANO, OF WARREN, MAINE.

DEVICE FOR PULLING AUTOMOBILES AND THE LIKE OUT OF MUD-PUDDLES, &c.

1,096,606.

Specification of Letters Patent.  Patented May 12, 1914.

Application filed July 12, 1913. Serial No. 778,748.

*To all whom it may concern:*

Be it known that I, CHARLES MORILLO GREENLEAF DELANO, a citizen of the United States, residing at Warren, in the county of Knox and State of Maine, have invented certain new and useful Improvements in Devices for Pulling Automobiles and the like Out of Mud-Puddles, &c., of which the following is a specification, reference being had to the accompanying drawings.

This invention comprehends certain new and useful improvements in devices for pulling automobiles and the like out of mud puddles, ditches, etc.

An object of the invention is to provide a device of this character which will be of extremely simple construction and operation, which may be readily attached to or removed from the vehicle and which will be highly efficient and effective in use.

Another object is to generally improve and simplify the construction and operation of devices of this character and increase the efficiency of the same.

With the above and other objects in view, my invention consists in certain novel constructions, combinations and arrangements of parts to be hereinafter more fully described, claimed, and illustrated in the accompanying drawings, in which—

Figure 1 is a side elevational view of my invention applied to an automobile, the latter being shown in dotted lines; Fig. 2 is a top plan view of a portion of the sectional wheel receiving member removed; Fig. 3 is a detail cross-sectional view on the line 3—3 of Fig. 1; and Fig. 4 is an enlarged detail cross-sectional view of the flexible tire engaging member, said view being taken on the line 4—4 of Fig. 1.

Referring more specifically to the drawings in which similar reference characters designate corresponding parts throughout the several views, 1 designates the stake which is adapted to be driven into the ground forwardly of the machine, and which has connected thereto one end of the cable 2 which is engaged over the pulley 3 carried by the hook 4 which is removably engaged over the front axle 5 of an automobile or other vehicle 6, as shown in Fig. 1. The cable is then engaged around the pulley 7 which is supported upon the rear axle 8 of the vehicle 6, by means of the hook 9, by which the pulley 7 is carried. The cable 2 is then engaged around the third pulley 10 which is also suspended upon the front axle 5, by means of the hook 11 by which the pulley 10 is carried, after which the rear end of the cable 2 is fastened to the connected forward ends of the chains 12 which have their rear ends connected with the forward looped ends of the connecting pins 13 which extend transversely through the opposite ends of the forward plate 14 of the sectional wheel receiving member. It will be seen that the wheel receiving member is formed of a plurality of plates 14 which are connected by the pins 13 which have their opposite ends looped and interlocked, as clearly shown at 15, in Fig. 2. Each plate 14 of the wheel receiving member has one end increased in thickness, as shown at 16, whereby when the wheel receiving member is placed in the mud puddle or ditch immediately in front of the wheel with the thick end 16 toward one side of the puddle or ditch or outwardly of the same, this side of the wheel receiving member will be raised higher than the other side, thereby making it easier to draw the wheel out of the mud puddle or ditch, as will be readily understood.

The plate at the inner end of the wheel receiving member is considerably smaller than the other plates 14 and the forward looped ends of the pins 13 engaged therethrough are connected with the rear looped ends of the pins of the adjacent plate 14, by the short connecting members 17. It will be understood that when the pulleys are secured to the axles of the vehicle and the wheel receiving member placed in position, the small plate at the rear end of said member is forced under the rear wheel in the mud puddle or ditch, whereby the wheel may be caused to ride upwardly upon the wheel receiving member. It will also be observed that by having the guide pulleys positioned as hereinbefore set forth, the cable 2 will be so disposed as to distribute the strain of the pull throughout the body of the vehicle and also result in the pull being upon the rear axle which, as is believed to be clearly apparent, is of material advantage.

Connected to the rear looped ends of the pins 13 engaged through the small plate 14 and the rear edge of said small plate, intermediate the ends thereof, by the screw eye 18 or other suitable means, are the forward ends of the cords 19 which are connected to the rear end of the flexible tire engaging member 20, which latter is formed of a pair of straps 21 for engagement upon opposite sides of the tread portion of the tire and connected by the cross straps 22 engaged transversely over the tread portion of the tire, the construction of the member 20 being clearly shown in Figs. 1 and 4. The forward end of the flexible tire engaging member 20 is retained in position by the forward extremities 23 of the parallel straps 21 and the buckle 24, said extremities 23 being bent at right angles to the main portions of the parallel straps and engaged around the inner portion of the tire and the felly, one of said extremities carrying the buckle 24, previously mentioned, while the other extremity is provided with a plurality of spaced perforations and adapted for engagement through the buckle, whereby the forward end of the tire encircling member may be readily and securely fastened in position.

From the foregoing, it will be readily seen that I have provided a device which may be readily attached to automobiles or other vehicles for pulling the rear wheel of the same out of a mud puddle or ditch, upon rotation of the rear axle. It will also be seen that this device may be readily removed from the vehicle and will occupy an extremely small space when not in use.

It will also be understood that minor changes in the details of construction and arrangements of the parts may be made within the scope of the appended claims without departing from the spirit of my invention or sacrificing any of the advantages of the same.

What I claim is:—

1. A device of the class described comprising a wheel receiving member composed of a plurality of connected transverse plates each having a thick end, thereby raising one side of the wheel receiving member, a tire engaging member connected to the wheel receiving member and adapted to be secured upon a tire, a cable connected with the wheel receiving member, an anchoring member secured to the cable, and means for guiding said cable.

2. A device of the class described comprising a wheel receiving member composed of a plurality of transverse plates having corresponding ends increased in thickness, said plates being connected by longitudinal connecting pins extended through the ends of said plates and having their ends interlocked, a wheel engaging member, one of the plates of the wheel receiving member being smaller than the remaining plates and of uniform thickness throughout its length, connections between the wheel engaging member and the wheel receiving member, a cable connected with the wheel receiving member, and anchoring means for said cable.

3. A device of the class described comprising a wheel receiving member adapted to be connected to a driving wheel of a vehicle, a flexible member connected with such wheel receiving member, guide means for the flexible member detachably engaged with the front and rear axles of the vehicle, and anchoring means for said cable.

In testimony whereof I hereunto affix my signature in the presence of two witnesses.

CHARLES MORILLO GREENLEAF DELANO.

Witnesses:
 W. H. WYLIE,
 D. B. STARRETT.

Copies of this patent may be obtained for five cents each, by addressing the "Commissioner of Patents, Washington, D. C."